US010126636B1

(12) United States Patent
Heppler et al.

(10) Patent No.: US 10,126,636 B1
(45) Date of Patent: Nov. 13, 2018

(54) IMAGE PROJECTION SYSTEM FOR A DRUM

(71) Applicants: Steven Glenn Heppler, Henderson, KY (US); Denis Earl Wright, Henderson, KY (US)

(72) Inventors: Steven Glenn Heppler, Henderson, KY (US); Denis Earl Wright, Henderson, KY (US)

( * ) Notice: Subject to any disclaimer, the term of this patent is extended or adjusted under 35 U.S.C. 154(b) by 0 days.

(21) Appl. No.: 15/182,940

(22) Filed: Jun. 15, 2016

Related U.S. Application Data

(60) Provisional application No. 62/181,437, filed on Jun. 18, 2015.

(51) Int. Cl.
*G03B 21/10* (2006.01)
*G03B 21/28* (2006.01)
*G03B 21/14* (2006.01)
*G10D 13/02* (2006.01)

(52) U.S. Cl.
CPC .......... *G03B 21/10* (2013.01); *G03B 21/142* (2013.01); *G03B 21/145* (2013.01); *G03B 21/28* (2013.01); *G10D 13/02* (2013.01); *G10D 13/027* (2013.01); *G10D 13/028* (2013.01)

(58) Field of Classification Search
CPC ...... G03B 21/28; G03B 21/10; G03B 21/142; G03B 21/145; G10D 13/02; G10D 13/027; G10D 13/028
See application file for complete search history.

(56) References Cited

U.S. PATENT DOCUMENTS

| 3,346,732 | A | 10/1967 | Crusius |
| 3,609,339 | A | 9/1971 | Smith |
| 4,091,706 | A | 5/1978 | Ludwig |
| 5,136,487 | A | 8/1992 | Schmidt |
| 5,280,742 | A | 1/1994 | Vergara |
| 5,922,981 | A | 7/1999 | Ballister |
| 7,259,758 | B2* | 8/2007 | Yee .................. G09G 5/006 345/204 |
| 7,271,328 | B2 | 9/2007 | Pangrle |
| 7,379,562 | B2* | 5/2008 | Wilson ............... G06F 3/0425 356/4.07 |
| 7,394,459 | B2* | 7/2008 | Bathiche .............. A63F 13/00 345/156 |
| 7,498,498 | B2 | 3/2009 | Lerner |
| 7,499,027 | B2* | 3/2009 | Brigham, II ....... G06F 3/03542 345/158 |
| 7,519,223 | B2* | 4/2009 | Dehlin ................ G06F 3/0354 345/173 |

(Continued)

*Primary Examiner* — Bao-Luan Le
(74) *Attorney, Agent, or Firm* — Taft Stettinius & Hollister LLP; Daniel J. Krieger

(57) ABSTRACT

An image projection system for a drum, including a batter drum head and a resonant drum head. The image projection system includes a projector support configured to support an image projector providing an image, a mirror; and a mirror support. The mirror support is configured to support the mirror, wherein the projector support and the mirror support are adjustably coupled to each other. An image is projected toward the mirror and reflected toward an interior surface of the resonant drum. The projected image is configured to provide an image viewable on an exterior surface of the resonant drumhead.

10 Claims, 7 Drawing Sheets

(56) References Cited

U.S. PATENT DOCUMENTS

| | | | | |
|---|---|---|---|---|
| 7,576,725 | B2* | 8/2009 | Bathiche | A63F 13/02 345/156 |
| 7,593,593 | B2* | 9/2009 | Wilson | G06F 3/0421 348/241 |
| 7,787,706 | B2* | 8/2010 | Yee | G06F 3/0425 345/211 |
| 7,907,128 | B2* | 3/2011 | Bathiche | A63F 13/00 345/173 |
| 8,016,432 | B2* | 9/2011 | Chang | G03B 21/28 348/745 |
| 8,416,206 | B2* | 4/2013 | Carpendale | G06F 3/0425 345/173 |
| 8,454,174 | B2* | 6/2013 | Nakano | G03B 21/14 248/176.1 |
| 8,519,952 | B2* | 8/2013 | Yee | G06F 3/0416 345/156 |
| 8,670,632 | B2* | 3/2014 | Wilson | G06F 3/0421 345/174 |
| 8,690,358 | B2* | 4/2014 | Larsen | H04N 5/66 348/208.4 |
| 8,985,788 | B2* | 3/2015 | Zhu | G03B 21/00 248/121 |
| 9,279,580 | B2* | 3/2016 | Jargiello, III | G10D 13/02 |
| 9,289,969 | B2* | 3/2016 | Wang | A63J 5/021 |
| 9,400,417 | B2* | 7/2016 | Nakano | G03B 21/14 |
| 9,430,096 | B2* | 8/2016 | Murase | G03B 17/54 |
| 9,618,832 | B2* | 4/2017 | Nakano | G03B 21/14 |
| 2005/0122308 | A1* | 6/2005 | Bell | G06F 3/011 345/156 |
| 2005/0226505 | A1* | 10/2005 | Wilson | G06F 3/0425 382/180 |
| 2005/0227217 | A1* | 10/2005 | Wilson | G06K 9/6203 434/337 |
| 2005/0245302 | A1* | 11/2005 | Bathiche | A63F 13/00 463/1 |
| 2005/0248729 | A1* | 11/2005 | Drucker | G03B 21/28 353/71 |
| 2005/0277071 | A1* | 12/2005 | Yee | G06F 3/0425 430/396 |
| 2005/0281475 | A1* | 12/2005 | Wilson | G06F 3/0421 382/254 |
| 2006/0007405 | A1* | 1/2006 | Chen | G03B 21/10 353/70 |
| 2006/0010400 | A1* | 1/2006 | Dehlin | G06F 3/0354 715/856 |
| 2006/0044289 | A1* | 3/2006 | Yee | G09G 5/006 345/204 |
| 2006/0092170 | A1* | 5/2006 | Bathiche | A63F 13/02 345/589 |
| 2006/0244719 | A1* | 11/2006 | Brigham, II | G06F 3/0425 345/156 |
| 2008/0193043 | A1* | 8/2008 | Wilson | G06F 3/0421 382/275 |
| 2009/0115972 | A1* | 5/2009 | Aizawa | G03B 21/10 353/74 |
| 2010/0103384 | A1* | 4/2010 | Chang | G03B 21/28 353/70 |
| 2010/0321646 | A1* | 12/2010 | Nakano | G03B 21/14 353/119 |
| 2011/0194035 | A1* | 8/2011 | Aizawa | G02B 17/08 348/744 |
| 2012/0169673 | A1* | 7/2012 | Wilson | G06F 3/0421 345/175 |
| 2012/0200834 | A1* | 8/2012 | Phillips | F16M 11/048 353/79 |
| 2012/0327315 | A1* | 12/2012 | Larsen | H04N 5/66 348/745 |
| 2013/0335714 | A1* | 12/2013 | Zhu | G03B 21/00 353/98 |
| 2014/0118629 | A1* | 5/2014 | Larsen | G03B 21/12 348/744 |
| 2014/0292647 | A1* | 10/2014 | Murase | G03B 17/54 345/156 |
| 2015/0009417 | A1* | 1/2015 | Jargiello, III | G10D 13/02 348/789 |
| 2015/0375493 | A1* | 12/2015 | Wang | A63J 5/021 428/195.1 |

* cited by examiner

IMAGE PROJECTION SYSTEM FOR A DRUM

RELATED APPLICATION

This application claims priority to U.S. Provisional Patent Application Ser. No. 62/181,437 entitled "Image Projection System for a Drum" filed Jun. 18, 2015, the disclosure of which is herein incorporated by reference in its entirety.

FIELD OF THE DISCLOSURE

The present disclosure relates to an image projection system for a percussion instrument, and in particular, a fixed image and/or a video image projection system for a bass drum.

BACKGROUND

Percussion instruments are used by many different types of musicians for different genres of music. In many genres of music, one of the percussion instruments often used is a large drum, typically a bass drum. The bass drum can either be carried by an individual in a marching band or placed on a floor or other support structure, where the drum remains relatively stationary for use by the musician. One well known type of bass drum is known as a kick drum and is part of a drum kit including other types of drums such as a floor tom, hanging toms, and different types of cymbals. The kick drum is generally of a cylindrical shape and includes two drum heads, a batter drum head and a resonant drum head, located at one or the other end of the cylinder. The batter drum head faces a drummer where the drummer moves a pedal attached to a beater which hits the batter drum head. The resonant drum head is attached to the other end of the cylinder and faces the audience. One or both of the drum heads can include holes to release air pressure created by the beater hitting the batter drum head.

Drums are typically made by large manufacturers and sold through retail outlets for either amateur or professional musicians. Many musicians prefer a drum made by one particular manufacturer over one or more drums made by other manufacturers. Knowing this, manufacturers spend large sums of money advertising their drums and will mark their drums with their trademark or logo. In almost all cases, the manufacturer will place its logo or trademark on an exterior surface of the resonant drum head facing the audience, since it can be easily seen by the audience and any musicians who may be in attendance. The drum heads provides a relatively large smooth exterior surface, upon which manufacturer's logo can be placed and therefore is a good location for its advertising.

SUMMARY

The present disclosure is directed to a projection system for a drum and in particular a projection system for a kick drum, often included as part of a drum kit. The projection system is configured to produce moving images on a bass drum head of kick drum of standard drum kit. In one embodiment, a projector and stand are configured to be adjustable from a closed position to an open position to enable the projector and the stand to be locatable in the interior of the bass drum, without removing one or both of the drum heads. By folding the collapsible and expandable stand with the projector, it can be placed through a hole in the bass drum head and fixed in place in the interior of the drum with a reusable or relatively permanent fastener. In one embodiment, the projector and/or stand are fixed in place with a hook and loop fastener. The projector is placed in the interior of the drum, close to the front resonant drum head end which projects an image to a mirror, located in the interior of the drum, close to the batter drum head. The projected image is reflected by the mirror to the interior back side of the resonant drum head to produce still or moving images capable of being seen by the audience. In other embodiments, one or both of the drum heads is removed to install the projection system within the drum.

In addition to the projector and support located within the drum, additional devices are included in different embodiments, to provide additional features. For instance, in one embodiment, electrical cabling coupled to the projection system is connected to a control panel, such as mixer board, to control the still or video images being displayed. The cabling incorporates jacks that are compatible with all known and future devices. In other embodiments, cordless technology is used. These connections to the projector enables the production of moving images with the use of VCR/DVD players, smartphones, computers, and cameras, for the display of real time, stored images, or computer generated images. Cameras, such as live cams or webcams, in other embodiments, are also incorporated to produce "real-time" moving images. Communication devices and communication applications, including telecommunication software, are also included in other embodiments. Internal or external speakers may be added to the projection system to use the drum projection system, when not being used in a live performance, such as between sets.

In one embodiment, there is provided an image projection system for a drum including a batter drum head and a resonant drum head each coupled to a drum shell. The image projection system includes a projector support configured to support an image projector providing an image, a mirror, and a mirror support. The mirror support is configured to support the mirror. The projector support and the mirror support are adjustably coupled to each other, such that the image is projected toward the mirror and reflected therefrom toward an interior surface of the resonant drum. A projected image is configured to provide a viewable image viewable on an exterior surface of the resonant drumhead.

In another embodiment, there is provided an image projection kit for a drum having a batter drum head and a resonant drum head each coupled to a drum shell. The image projection kit includes a projector support configured to support an image projector providing an image, a mirror, and a mirror support configured to support the mirror. The projector support and the mirror support are configured to be adjustably coupled to each other to enable an image to be adjustably projected toward the mirror and reflected therefrom toward an interior surface of the resonant drum, wherein projected image is a reverse image configured to provide a viewable image viewable on an exterior surface of the resonant drumhead.

In still another embodiment, there is provided an image projection system for a drum including a batter drum head and a resonant drum head each coupled to a drum shell. The image projection system includes a projector support configured to support an image projector providing an image, a mirror, a base, and a mirror support configured to support the mirror, wherein the projector support and the mirror support are coupled to each other through the base. One of the mirror support and projector support are adjustably coupled to the base to enable the image to be adjustably located on the mirror and to be reflected therefrom toward an interior surface of the resonant drum.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
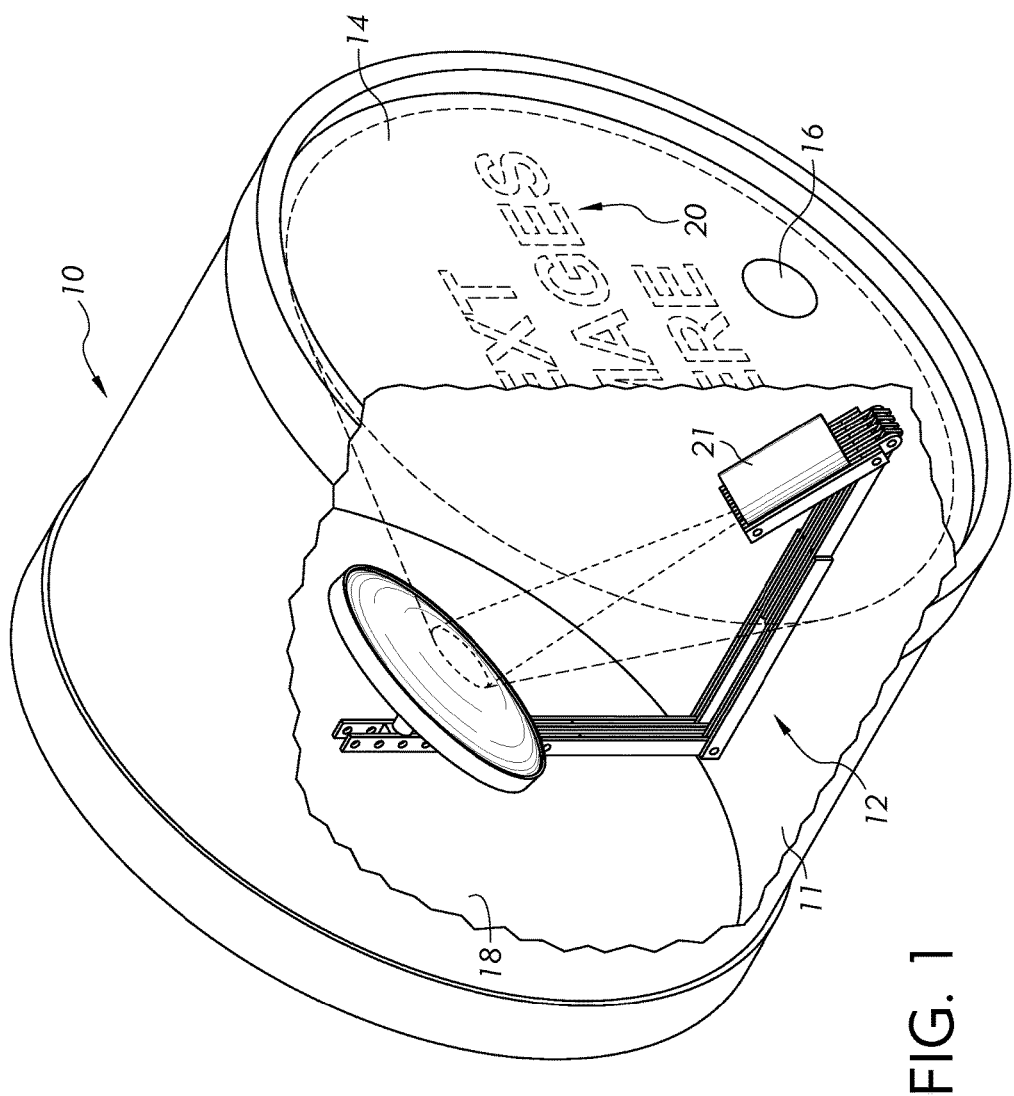
FIG. 1 illustrates a perspective view of a bass kick drum including a drum projection system.

FIG. 1 illustrates a perspective view of a bass kick drum 10 incorporating a bass drum projection system 12. The bass kick drum 10 includes a cylinder 11, also known as a drum shell, having at one end a resonant drum head 14 having a hole 16, which provides for the release of pressure waves produced when a batter drum head 18, located at the other end of the cylinder 11, is hit. In this embodiment, the hole 16 also provides access for the placement of a drum projection system 12 in other embodiments disclosed herein within the drum 10. In embodiments where the drumhead 14 does not include the hole 16, a template is provided as well as instructions how to cut the hole 16 of the proper size. The template is placed at the drum head 14 in a location and a hole is cut in the drumhead 14 with a cutting device. In one embodiment, the hole 16 is used as described herein to mount the system 12 within the drum 10. The drumhead material cut with the template can be re-applied to the drum head to cover the hole, if desired.

The drum projection system 12 projects an image 20 from an image generator 21 toward a mirror 23 which is reflected from the mirror and upon the inside of the resonant drum head 14. The image includes one or more of text, a still image, and a moving image, such as a video image. See also FIG. 3. The bass kick drum includes legs (not shown) which stabilize the drum 10 upon a support surface, such as a floor, a stage or a riser. In some bass kick drums, the hole 16 is included in a purchased bass kick drum 10. In other embodiments, described, herein, the hole 16 is cut by a user of the drum or of the projection system, or by a projection system installer.

Figure 2:
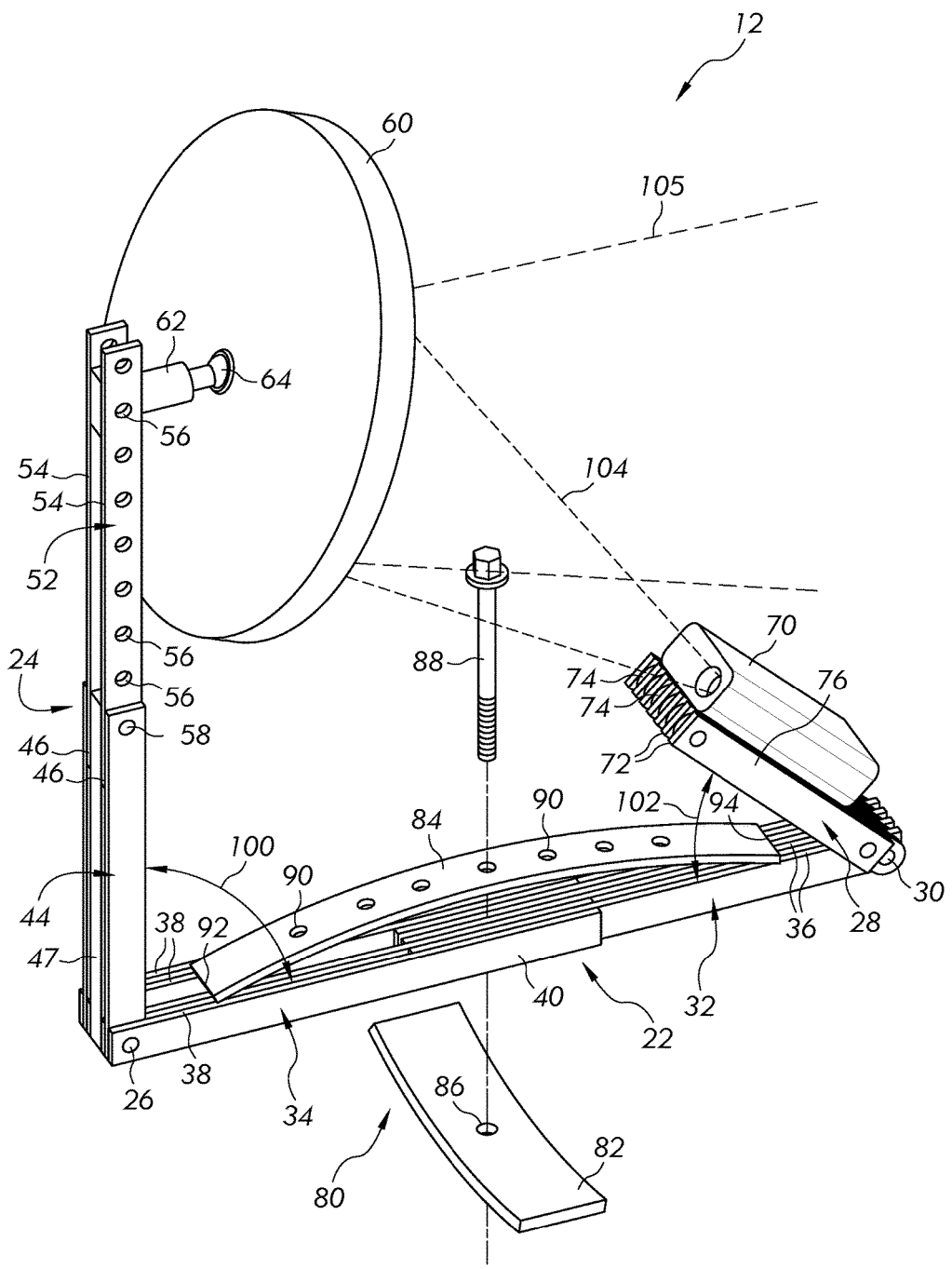
FIG. 2 illustrates one embodiment of a drum projection system.

In one embodiment, the system 12 of FIG. 2 is configured to be folded and to be placed through the hole 16 of the drum 10 of FIG. 1. In this embodiment, the resonant drum head 14 is a white coated resonant bass drumhead. The system 12 includes a first support 22, or base, a second support 24 movably coupled to the first support 22 at a pivot 26, and a third support 28 pivotably coupled to the first support 22 at a pivot 30. In this configuration, the first support 22 includes a first member 32 and a second member 34 which are configured to respectively slide with respect to one another to adjust the length of the base 22 such that the length is adjustable to fit drum of different dimensions.

As can be seen in FIG. 2, the first member 32 includes a plurality of pieces 36. The second member 34 also includes a plurality of pieces 38. Each of the pieces 36 and 38 has a length extending along a bottom inside portion of the drum 10, when installed. In other embodiments, the pieces 36 and 38 include holes such as those illustrated in FIG. 5. Pieces 36 of the first portion 32 are disposed adjacently to the pieces 38 of the second portion 34 at a central location 40 of the base 22. The pieces 36 and pieces 38 are in contact at the central portion 40 and provide a relatively stable sliding fit between the first portion 32 and the second portion 34. In one embodiment, a coupler 42, such as that shown in FIG. 5, couples the pieces 36 to the pieces 38 to fix the location of each with respect to one another such the length of the base is fixed to a preferred length of installation of the system 12 within the interior of the drum 10. In other embodiments, a clamp or other coupling mechanisms is used to fix the overall length of the base support 22 to a desired length. In still other embodiments, the first portion 32 and the second portion 34 are each individually held to the interior of the drum shell either with added support such as supports shown in FIGS. 2, 4, and 5. As can be seen in FIG. 2, the pieces 36 and the pieces 38 are spaced apart at locations other than at the central portion 40. In one embodiment, the pieces 36 and 38 are formed of slats of wood, such as oak or other hardwoods. In other embodiment, the pieces 36 and 38 are formed of slats of a metal, such as aluminum or steel.

The second support 24 includes a first member 44 including a plurality of pieces 46 and a piece 47, and a second member 52 including a plurality of pieces 54. In the illustrated embodiment the first member 44 includes two of the pieces 46 and which are coupled to the second portion 34 at the pivot 26. The piece 47 is located between the two interior pieces 46 to provide support. The pieces 46 include a width less than the width of the piece 47. The pieces 46 are located to provide a space between each of the pieces 46 and the piece 47 which are sufficiently sized to receive an end of each of the pieces 54.

The pieces 54 include a plurality of apertures 56 which are disposed along a length of the pieces 56 and which are configured to be located adjacently to apertures 58 disposed at one end of the pieces 46 and 47. Sliding movement of the pieces 54 with the pieces 46 and 47 adjusts a height of the second support 24 with respect to the base 22.

A mirror 60 is coupled to the second member 52 with a mirror support 62. The mirror support 62 includes at one end a pivot support 64 to which the mirror 60 is coupled. In one embodiment, the pivot support 64 is a ball and socket arrangement which provides for adjustment of the mirror 60 over a large range of angles. A second end of the mirror support 66 includes an aperture configured to line up with one of the apertures 56. Consequently, the height of the mirror 60 can be adjusted with respect to the base 22 as well as with respect to the second support 24. Additionally, the height of the mirror 60 is adjusted at the aperture 58, such the two locations of height adjustment are provided in this one embodiment. This configuration therefore provides fine tuning of the mirror 60 with respect to a projector 70 supported by the third support 28. In one embodiment, the projector 70 is fixedly coupled to the third support by a hook and loop fastener. In one embodiment, the projector 70 is a pico projector, also known as a handheld projector. In this and other embodiments described herein, the mirror is of different sizes generally ranging from 1 inch to 6 inches depending on the projector used. In one embodiment, a 3 inch round fish-eye mirror is used. In another embodiment, the mirror 60 is a convex 6 inch road truck mirror. In one embodiment, a convex 6 inch mirror is an Open Road convex mirror available from Cham-Cal Engineering of Garden Grove, Calif.

The distance between the projector and the mirror is adjustable to increase or decrease the throw distance of projection, and to accommodate different size drums. Also different size convex mirrors, with varying curvatures, are used to accommodate different size drums and or projector characteristics. The projector projects moving images to the convex mirror, the mirror then projects moving images to the inside of the drum head projecting images through drum head to produce correct moving images on the outside of drum head to be viewed.

The angle of the projector is determined by the height of the mirror and the distance between the mirror and projector. The height of the mirror is determined by the diameter of the drum, with the height of the mirror, in one embodiment, being half the diameter of the drum. For instance, with the drum being twenty two inches in diameter the height of the mirror would be eleven inches. The height of the mirror is determined to project an image properly aligned to the resonant drum head. Consequently, the height of the mirror, in other embodiment, varies from one half the diameter of the drum. The device is adjustable to fit drums being fourteen inches in diameter up to twenty-eight inches in diameter with mirror height being from seven inches up to fourteen inches high. The throw distance between the mirror and the projector can be adjusted to accommodate drums between twelve inches to eighteen inches in depth. All the lengths, widths, and the height of the device can be changed to accommodate smaller and/or larger drums.

The third support 28 includes a plurality of pieces 72 each of which is aligned in parallel with respect to adjacent pieces 72. The pieces 72 are coupled at one end to the base 22 at the pivot 30. At one end of the pieces 72, the pieces 72 fit within the spaces 36 of the second portion 32. At another end of the pieces 72, spacers 74 are located in the spaces between the pieces 72 to maintain the structure of the third support 28. The pieces 72 define a support 76 upon which the projector 70 is located.

In the embodiment of FIG. 2, the base 22 is fixedly located in the interior of the drum 10 with a support system 80 including a drum bracket 82 and a support bracket 84. The drum bracket 82 includes a curved configuration generally defining a radius and an aperture 86. In one embodiment, the drum bracket 82 is formed of a resilient material, such as plastic or spring steel, having a sufficient spring to conform to the outer curved surface of the drum 10. A hole, not shown, is located in a bottom portion of the drum. A connector 88 extends through the drum, through the aperture 86, and one of a plurality of apertures 90 located in the support bracket 84.

The support bracket 84 includes a curved configuration generally defining a radius and a length along which the apertures 90 are located. The connector 88 is locatable at any one of the apertures 90 depending on the final configuration of the system 12 when installed. The support bracket 84 is formed of a resilient material, such as plastic or spring steel, having a sufficient spring to fixedly hold the base 22 in place when installed. Additionally a first end 92 and a second end 94 are located at intermediate locations of each of the first portion 32 and the second portion 34 to hold the base 22 securely when the system 12 is installed. In this fashion, movement of the system 12 during drumming is kept at a minimum.

The second support 24 is rotatably adjustable with respect to the first support 22 about the pivot 26 to define a first adjustment angle 100. The third support 28 is rotatably adjustable with respect to the first support 22 about the pivot 30 to define a second adjustment angle 102. Connectors (not shown) are located at each of the pivots 26 and 30 to maintain the first adjustment angle 100 and the second adjustment angle 102 at fixed locations to properly align an image output 104 of the projection 70 with the surface of the mirror 60. The system 12, in different embodiments, includes a plurality of adjustable configurations to properly locate a reflected image 105 from the mirror upon the interior surface of the resonant drum head 14. The adjustments include the length of the base portion 22, the height of the second support, the angle of the second support with the base, the angle of the third support with the base, and the angle of the mirror with respect to the second support 24. The location of the projector 70 along the length of the support 76 is adjustable to focus the image if necessary. This system 12, in different embodiments, is made in a number of different sizes to accommodate a variety different size and style of drums.

Figure 3:
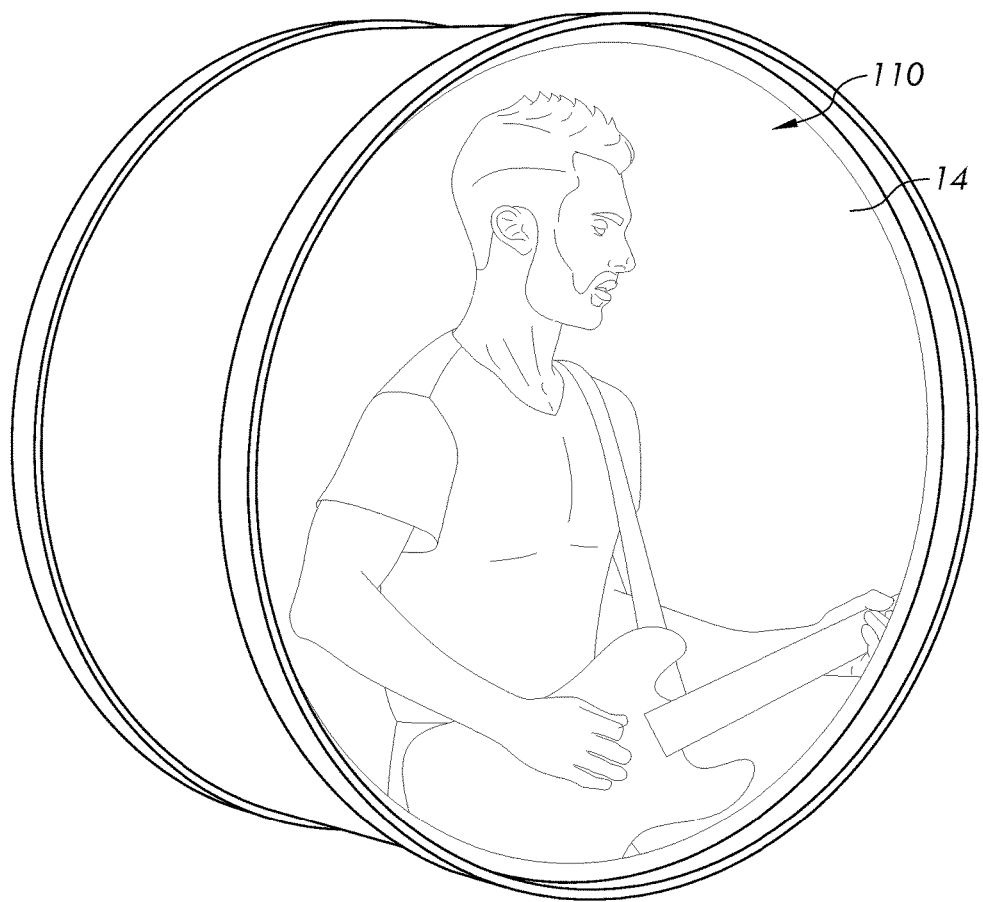
FIG. 3 illustrates an image projected on a resonant drum head of a bass drum using the image projection system.

As seen in FIG. 3, an image output 110 of the projector 70 is displayed on in inside surface of the resonant drum head 14, but is visible to an individual or an audience viewing the image. Since the image is reflected from the mirror to the backside of the resonant drumhead 14, a projected image is provided by the projector, in one embodiment, as a reverse image. By projecting a reverse image and then reflecting the image to the inside of the resonant drumhead 14, the audience sees a projected image on the exterior surface of the resonant drumhead which is properly displayed for viewing by the audience. Consequently, should the image include a word, logo or symbol, for instance, the word or symbol or logo is properly displayed for reading by the audience. In one embodiment, a white coated drumhead works well for display of the image. A commercially available drumhead such as a REMO Ambassador drum head provides a suitable surface for receiving and displaying the image.

In another embodiment, the inside surface of the drumhead 14 is covered with a projection film which enhances the image directed to the resonant drum head 14. In another embodiment, the resonant drum head 14 is made from the projection film. In these and different embodiments, a projection film labeled "Vikuiti", available from 3M Company of St. Paul, Minn., is used.

Figure 4:
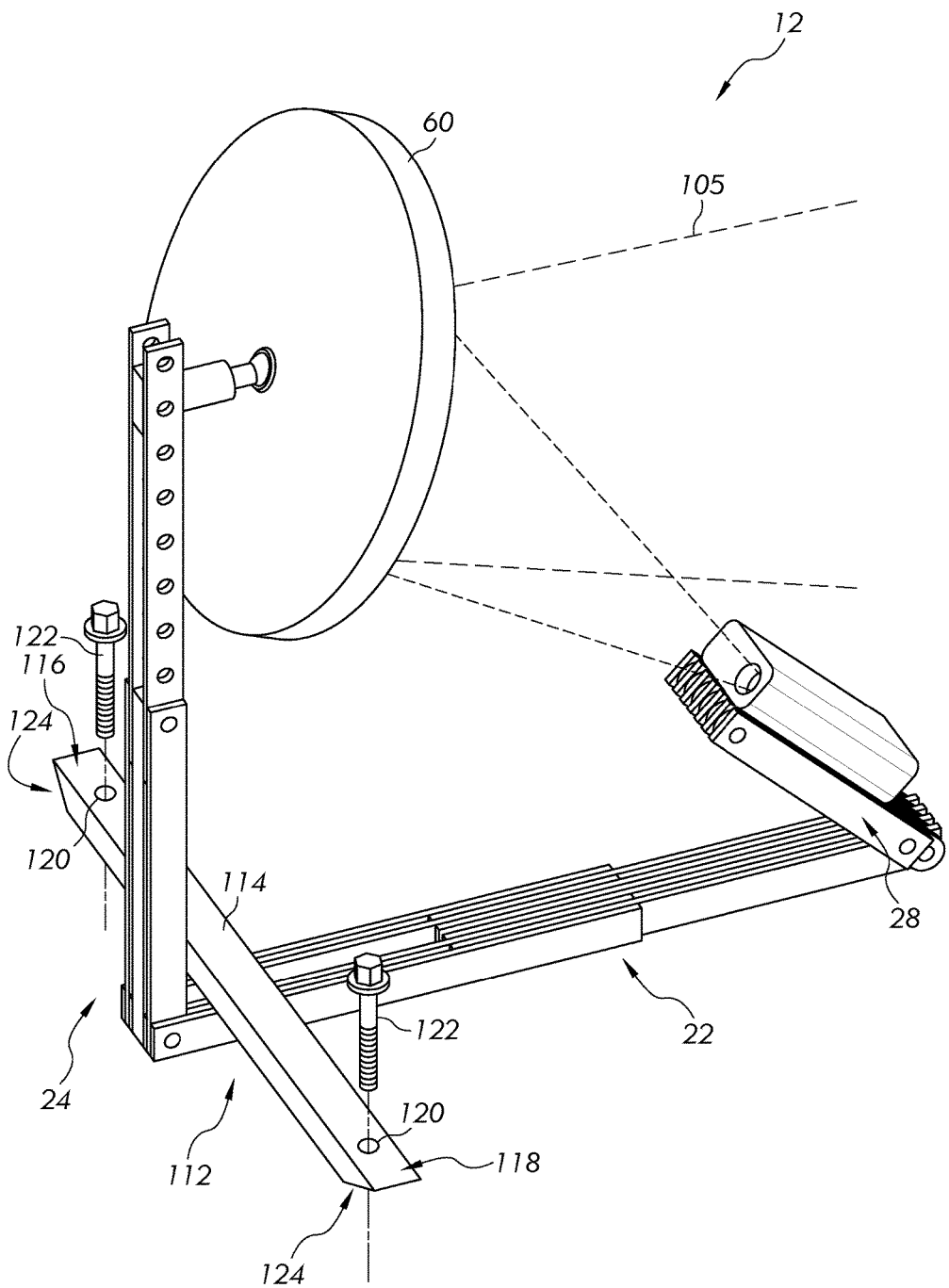
FIG. 4 illustrates another embodiment of a drum projection system.

FIG. 4 illustrates another embodiment of the system 12 including the first support 22, the second support 24 and the third support 28. A support system 112 includes a bar or rod 114 having a first end 116 and a second end 118 each of which defines an aperture 120 configured to receive a connector 122, such as a bolt. The support system 112, or stabilizer, stabilizes the system 12 with respect to the drum and the resonant drum head. Each of the ends 116 and 118 include an inclined surface 124 having a slope or a curve configured to interface with the curved interior surface of the drum 10. A first and second hole, not shown, are located in the drum 10 of the interior surface of the cylinder 11 and formed by the user or the installer. The cylinders 11 of different drums may be made of different materials, such as wood or metal, and the holes made in the cylinder, in one embodiment, are drilled. Once drilled, the connectors 122 are placed through the apertures 120 and into the cylinder 11 to hold the system 12 in place. The bar 114 is located in contact with the first support and crosses the first support to hold the system 12 in place. While the bar 114 is shown as being located closer to the second support 24 than to the third support 28, other locations of the bar 114 are possible.

Figure 5:
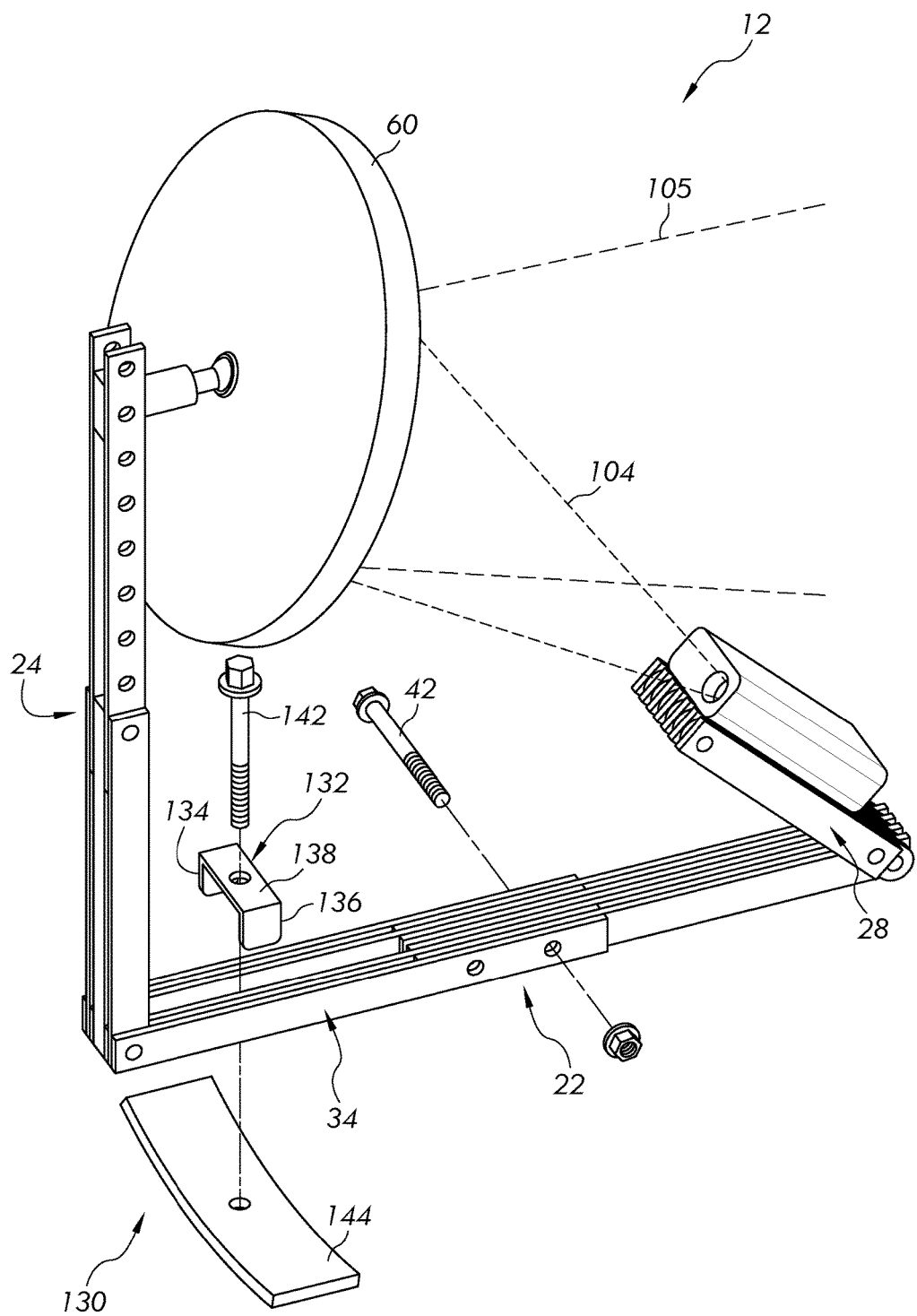
FIG. 5 illustrates another embodiment of a drum projection system.

FIG. 5 illustrates another embodiment of the system 12 including the first support 22, the second support 24 and the third support 28. A support system 130 includes a bar or rod 132 having a first end 134 and a second end 136. A center portion 138, disposed between the first end 134 and the second end 136, includes an aperture 140 configured to receive a connector 142, such as a bolt. Each of the ends 134 and 136 are formed to extend at an angle of about 90 degrees from the central portion 138 to define a surface configured to be located adjacent to surfaces of the second portion 34. A length of the central portion 138 is established to extend across the width of the second portion 34 and to enable each of the first end 134 and the second end 136 to come into contact with the second portion 34.

A drum bracket 144 is located on an exterior surface of the drum cylinder 11 which includes a hole, not shown, through which the connector 142 extends to hold the first support 22 stably in place. Once secured, the first end 134 and the second end 136 reduce or substantially prevent side to side movement of the base 22 within the cylinder 11. While the location of the support 140 is shown located toward the second support 24, other locations are possible.

Figure 6:
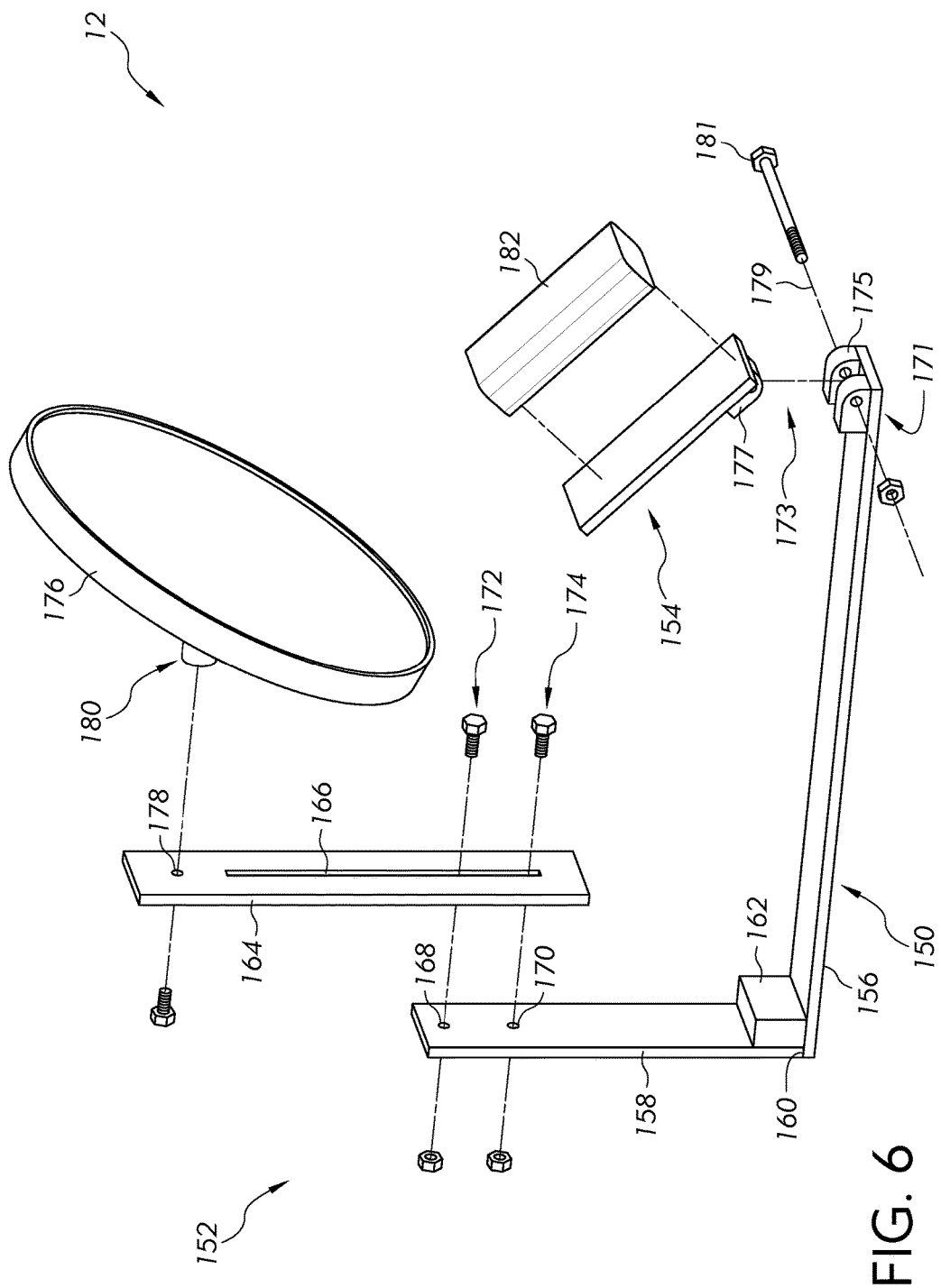
FIG. 6 illustrates another embodiment of a drum projection system.

FIG. 6 illustrates another embodiment of the system 12 including a first support 150, a second support 152, and a third support 154. In this embodiment each of the first, second, and third supports are made of a wood material, which in one embodiment is a hardwood which is selected for rigidity, and if desired for an esthetic purpose, as well. The first support 150 provides a base for the system 12 and includes a first member 156 and a second member 158. The second member 158 is rigidly fixed to the first member 156 at an interface 160 which is supported by a support piece 162. In one embodiment, the support piece 162 fixes the angle between the first member 156 and the second member 158 at a substantially ninety (90) degree angle.

Each of the first and second members 156 and 158 include a generally rectangular cross-section. The length of the first member 156 is selected to extend along a bottom interior floor of the cylinder 11. The length of the second member 158 is selected to mate with a third member 164 which includes a slot 166 extending along the length of the third member 164. The second member 158 includes a first aperture 168 and a second aperture 170 which accept a first connector 172 and a second connector 174. The first and second connectors 172 and 174 extend through the slot 166 and the apertures 168 and 170 and, when tightened, fix the adjustable height of a mirror 176.

The third support 154 is rotatably supported at an end 171 of the first member 156. A hinge 173 includes a first part 175 and a second part 177 which when engaged provide for angular adjustment of the third support 154 about a pivot 179 defined by a location of a connector 181.

The mirror 176 is coupled to the third member 164 at an aperture 178. In one embodiment, a mirror support 180 includes, at one end, a pivot support to which the mirror 176 is coupled. In this embodiment, the mirror support 180 provides for angular adjustment with respect to a projector 182 supported by the third support 154. Adjustment of the projector about the pivot support as well as adjustment of the third support 154 about the pivot 179 provides for accurate placement of the projected image at the interior of the resonant drum head 14.

Figure 7:
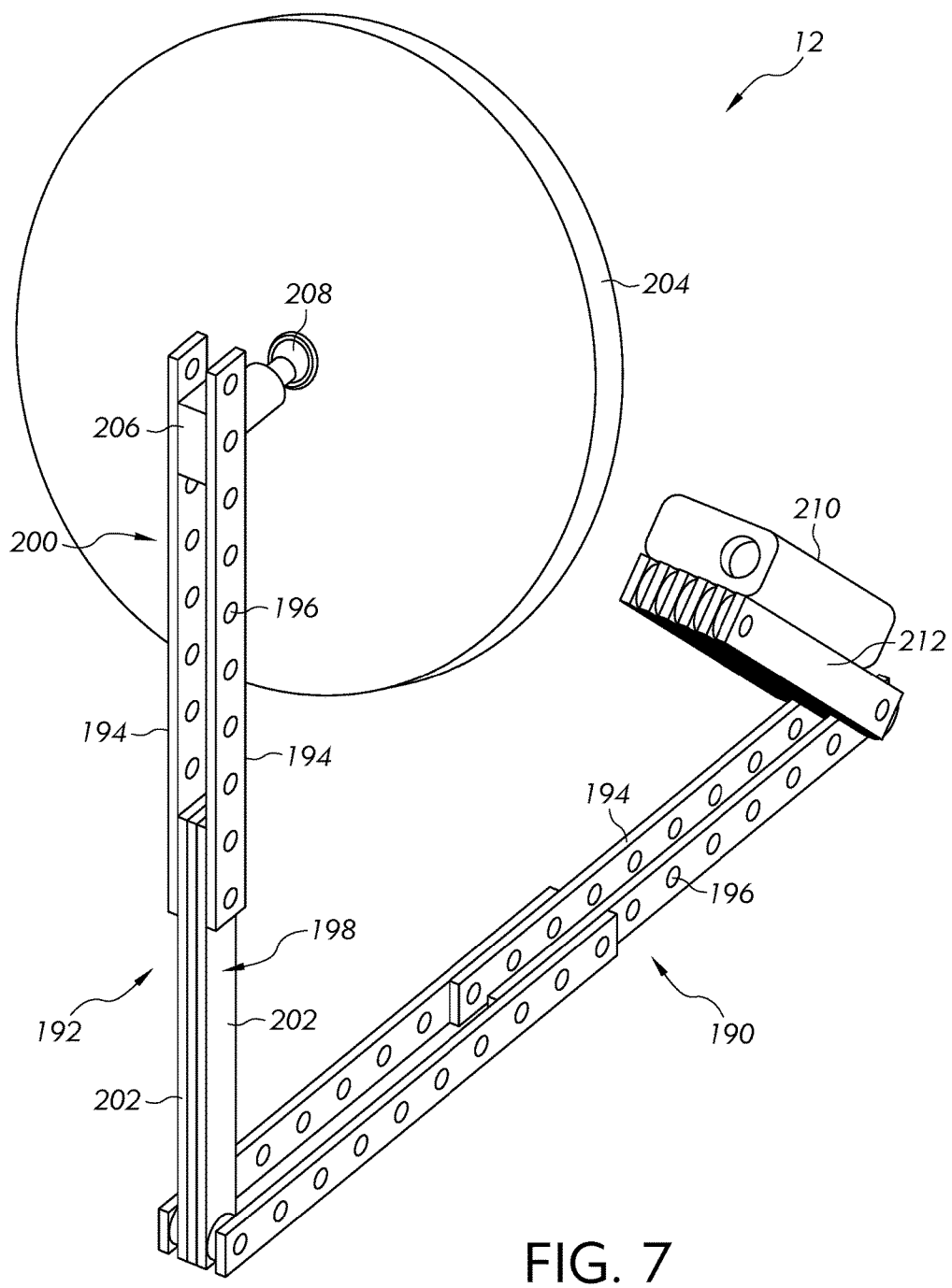
FIG. 7 illustrates another embodiment of a drum projection system.

FIG. 7 illustrates another embodiment of the system 12 including a first support 190, a second support 192, and a third support 194. In this embodiment each of the first support 190 and second 192 includes bars 194 having spaced apertures 196. The apertures provide for adjustment of the length of the first support at a number of different lengths to accommodate a wide variety of different sizes of drums 10.

The second support 192 includes a first structure 198 and a second structure 200, which includes the aperture bars 194, extending from the first structure 198. The first structure 198 includes bars 202 which include apertures at respective ends of the bars 202 configured to engage connectors. In another embodiment, the bars 202 include the apertures 196.

A mirror 204 is coupled to a mirror support 206, which includes an aperture configured to accept a connector (not shown) which extends through a selected aperture 196. The mirror 204 includes a pivot support 208 to pivotably adjust the mirror 204 with respect to a projector 210 supported by a support 212. Consequently, in this embodiment the height of the mirror 204 is adjustable at an end of the first structure 198 coupled to the second structure 200, and at an end of the second structure 200 coupled to the mirror support 206. In another embodiment, the spacing of the apertures 196 along the first support 190 is different than the spacing of the apertures 196 of the second structure 200.

As seen in the described embodiments, the system 12 includes a number of adjustable components to insure the accurate placement of the projected image on the interior surface of the resonant drum head 14. The projector is adjustable along the first support to increase or decrease the distance between the projector and the second support. The projector is also angularly and elevationally adjustable to provide for directed placement of the projected image upon the mirror. The height of the mirror with respect to the first support is adjustable as well. In another embodiment, the angle of the mirror is adjustable at the mirror support, at the base of the first support, or at both. Consequently, the described embodiments are configured to provide a drum projection system which not only provides for the accurate placement of the image at the resonant drumhead, but which is also configured to enable locating the projection unit within the kick drum without disassembling the kick drum.

Each of the supports, in different embodiments is made of the same or different materials based on cost, accessibility, and manufacturability. Consequently, different types of materials are used and include, but are not limited, to wood, metal, plastic, fiberglass, and glass. In these and other embodiments, a shock absorbing material is located between the first support and the interior of the cylinder 11. Different types of shock absorbing materials such as foam, gel pad, or air cushion materials each of which is configured to control or reduce vibration resulting from use of the drum are used. These resilient materials, in different embodiments, are used in many different locations of the system 12, such as foam or rubber washers at the pivot locations, and between some, a portion of, or all of assembled parts to control vibration which may affect the image. In other embodiments, the projector includes image stabilization of images thereby reducing or eliminating the need for vibration control.

Many of the projector and mirror mounting systems may be interchanged or combined into a single unit. Additional operational features, in other embodiments, are provided. For instance, wires coupled to a switchboard and to a live video feed which is projected at the bass drum. Wireless communication with the projector is provided in other embodiments. Additionally, a computer and/or "Smart" phone are connected to provide images to the projector for display of moving images on the drum. The live video feed enables the display of "real time" moving images. Additionally other video generating devices such a conventional television having video out jacks, video tape recorders/players, and digital video disc players are used, in other embodiments. Many drums include a small hole in at least one of the drum heads to prevent compression and to enable the drum to breathe. This hole may be used to run web cam cord through to projector to produce live images. Cordless devices can also be used.

The present disclosure is not limited to a bass drum only, and the disclosed embodiments are configurable to be used with many different size drums. For instance a marching bass drum or any other drum played by the drummer is walking is possible Many variations and materials may be utilized in this unit. It can be fixed to expanding hoop or to existing hardware of drums. It may also become a two piece unit by disassembly with the projector and the mirror being fixed on opposite ends of drum in many fashions.

In other embodiments, the mirror is eliminated and an appropriately sized image projector, such as a micro-projector configured to reverse and to cast a circular moving image is included. The micro-projector is located toward the batter drum head end of drum and directed toward the resonant drum head end of drum to provide a upright moving image on the inside of the resonant drum head to be viewed by the audience viewer. The "luminant" candle power of the projector determines the brightness of the image. The distance of the throw of projection determines placement of projector.

The bass drum TV may also be equipped with internal or external speakers to be used when drum is not being played.

In another embodiment of the present disclosure, the image projection system for a bass drum is configured as a kit. The kit is provided as an image projection system including an image projector, a projector support, a mirror, and a mirror support, each of which is configured to be used with a particular size of bass drum or a range of bass drum sizes. In another embodiment, the kit does not include an image projector, but is purchased separately form the image projection system kit. In one embodiment, the kit includes a template which enables the user to cut the appropriate sized hole in one of the drum heads such that once the hole is cut, the projection system can be placed within the drum without the need for disassembling the drum. The projector support is collapsible as described herein to fit through the hole and is then opened to enable alignment of the projector with the mirror. In another embodiment, the kit includes a projection film which can be cut to size and affixed to the inside surface of the resonant drum head.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An image projection system for a drum including a batter drum head and a resonant drum head each coupled to a cylindrical drum shell, wherein the cylindrical drum shell includes an interior surface having a bottom inside portion, the image projection system comprising:
a convex mirror;
a base positioned at the bottom inside portion of the drum shell and extending between the resonant drum head and the batter drum head, wherein the base includes a first base member having a plurality of first bars and a second base member including a plurality of second bars wherein the first bars are interleaved with the second bars at a central portion of the base and provide a sliding fit between the plurality of first bars and the plurality of second bars to adjust a length of the base to fit between the batter drum head and the resonant drum head;
a mirror support coupled to a first end of the base and configured to support the convex mirror within the drum shell, wherein the mirror support includes a first member, a pivot support coupled to the first member and pivotably coupled to the convex mirror, and a second member operatively connected to the base, wherein the first member is adjustably coupled to the second member and adjustment of the first member with respect to the second member adjusts a height of the mirror with respect to the base;
a projector support configured to support an image projector providing an image, the projector support pivotably coupled to a second end of the base and configured to angularly adjust the position of the image projector with respect to the base and with respect to the convex mirror;
wherein length adjustment of the base, angular adjustment of the projector support, height adjustment of the mirror support, and pivotable adjustment of the convex mirror at the pivot support enables the image to be adjustably located on the convex mirror and to be reflected therefrom toward an interior surface of the resonant drum head for viewing on an exterior surface of the resonant drum head, the image for viewing at the exterior surface by an individual.

2. The image projection system of claim 1 further comprising a support system configured to engage the drum shell and the base, wherein the support system includes a drum bracket configured to be positioned on an outer surface of the drum shell and includes a connector operatively connected to the base, extending through the drum shell, and configured to couple the drum bracket to the drum shell and the base at the interior surface of the drum shell.

3. The image projection system of claim 2 wherein the drum bracket is curved and is formed of a resilient material to conform to the outer curved surface of the drum shell.

4. The image projection system of claim 3 further comprising a shock absorbing material located between the base and the interior surface of the cylinder to reduce vibration of the base resulting from use of the drum.

5. The image projection system of claim 2 wherein the projector support and the mirror support are each adjustable with respect to the base to provide an image at the resonant drum head without blocking a portion of the image located at the interior surface of the resonant drum head which is viewable on the exterior surface of the resonant drum head.

6. The image projection system of claim 1 further comprising a support system configured to engage the drum shell and the base, wherein the support system includes a first connector, a second connector, and a bar configured to be positioned on the interior surface of the drum shell, wherein the bar includes a middle portion, a first end and a second end, wherein the middle portion is configured to contact the base and each of the first end and the second end includes an aperture and an inclined surface configured to interface with the interior surface of the drum shell, the first connector configured to extend through the aperture of the first end and the second connector configured to extend through the aperture of the second end.

7. The image projection system of claim 1 further comprising a base coupler, wherein each of the plurality of first bars includes a plurality of first bar apertures and each of the plurality of second bars includes a plurality of second bar aperture, wherein the base coupler is configured to extend through the first bar apertures and the second bar apertures when aligned to fix the length of the base at a desired length.

8. The image projection system of claim 1 further comprising a template including a hole configured to define a location of a drum head hole to be cut into one of the batter drum head and the resonant drum head.

9. The image projection system of claim 8 further comprising a projection film configured to be attached to the inside surface of the resonant drum head.

10. The image projection system of claim 1 further comprising a projection film configured to be attached to the inside surface of the resonant drum head.

\* \* \* \* \*